(12) United States Patent
Raikar et al.

(10) Patent No.: US 10,077,020 B2
(45) Date of Patent: Sep. 18, 2018

(54) SYSTEMS AND METHODS FOR DEPLOYABLE REACTION SURFACE FOR ROOF RAIL AIRBAG SYSTEM

(71) Applicant: GM Global Technology Operations LLC, Detroit, MI (US)

(72) Inventors: Sadanand N. Raikar, Bangalore (IN); Mukesh Amin, Canton, MI (US); Jeffrey J. Schultz, Grand Blanc, MI (US); Stephen J. Cassatta, Wixom, MI (US); Louis Shaun Campbell, Waterford, MI (US); Sandy Dean Mabery, St. Petersburg, FL (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/398,082

(22) Filed: Jan. 4, 2017

(65) Prior Publication Data
US 2018/0186328 A1 Jul. 5, 2018

(51) Int. Cl.
| | | |
|---|---|---|
| *B60R 21/232* | (2011.01) | |
| *B60R 21/213* | (2011.01) | |
| *B60R 21/13* | (2006.01) | |
| *B60R 21/01* | (2006.01) | |
| *B60R 21/06* | (2006.01) | |
| *B60R 21/08* | (2006.01) | |
| *B60R 21/16* | (2006.01) | |
| *B60R 21/00* | (2006.01) | |

(52) U.S. Cl.
CPC .......... *B60R 21/232* (2013.01); *B60R 21/01* (2013.01); *B60R 21/06* (2013.01); *B60R 21/08* (2013.01); *B60R 21/13* (2013.01); *B60R 21/213* (2013.01); *B60R 2021/0018* (2013.01); *B60R 2021/01013* (2013.01); *B60R 2021/01252* (2013.01); *B60R 2021/161* (2013.01)

(58) Field of Classification Search
CPC ....... B60R 21/232; B60R 21/01; B60R 21/06; B60R 21/08; B60R 21/13; B60R 21/213; B60R 2021/0018; B60R 2021/0103; B60R 2021/01252; B60R 2021/161
See application file for complete search history.

(56) References Cited

U.S. PATENT DOCUMENTS

| | | | | |
|---|---|---|---|---|
| 6,773,031 B2 * | 8/2004 | Haig | ...................... | B60R 21/08 280/730.2 |
| 6,893,045 B2 * | 5/2005 | Inoue | ..................... | B60R 13/02 280/730.2 |
| 7,322,606 B2 * | 1/2008 | Yamamura | ............. | B60J 1/2025 280/730.2 |

(Continued)

*Primary Examiner* — Drew J Brown

(57) ABSTRACT

An occupant restraint system of a vehicle includes a roof rail airbag that is located at a roof rail of the vehicle and above a door of the vehicle and that is configured to deploy in an outboard direction. A deployment device, when triggered, deploys the roof rail airbag. An actuator, when triggered, actuates a deployable reaction surface (i) from a first state where the deployable reaction surface is stowed behind interior door trim and does not block any part of a window opening of the door when viewed from inboard of the deployable reaction surface (ii) to a second state where the deployable reaction surface blocks at least a portion of the window opening of the door when viewed from inboard of the deployable reaction surface.

20 Claims, 8 Drawing Sheets

(56) References Cited

U.S. PATENT DOCUMENTS

| | | | |
|---|---|---|---|
| 7,390,017 B2* | 6/2008 | Inoue | B60R 13/02 280/730.2 |
| 9,637,081 B2* | 5/2017 | Ryan | B60R 21/23138 |
| 2001/0033073 A1* | 10/2001 | Hammond | B60R 21/06 280/730.2 |
| 2012/0193897 A1* | 8/2012 | Ruedisueli | B60R 21/21 280/730.2 |
| 2016/0096491 A1* | 4/2016 | Sitko | B60R 13/0275 280/730.2 |
| 2017/0050608 A1* | 2/2017 | Meissner | B60R 21/232 |

* cited by examiner

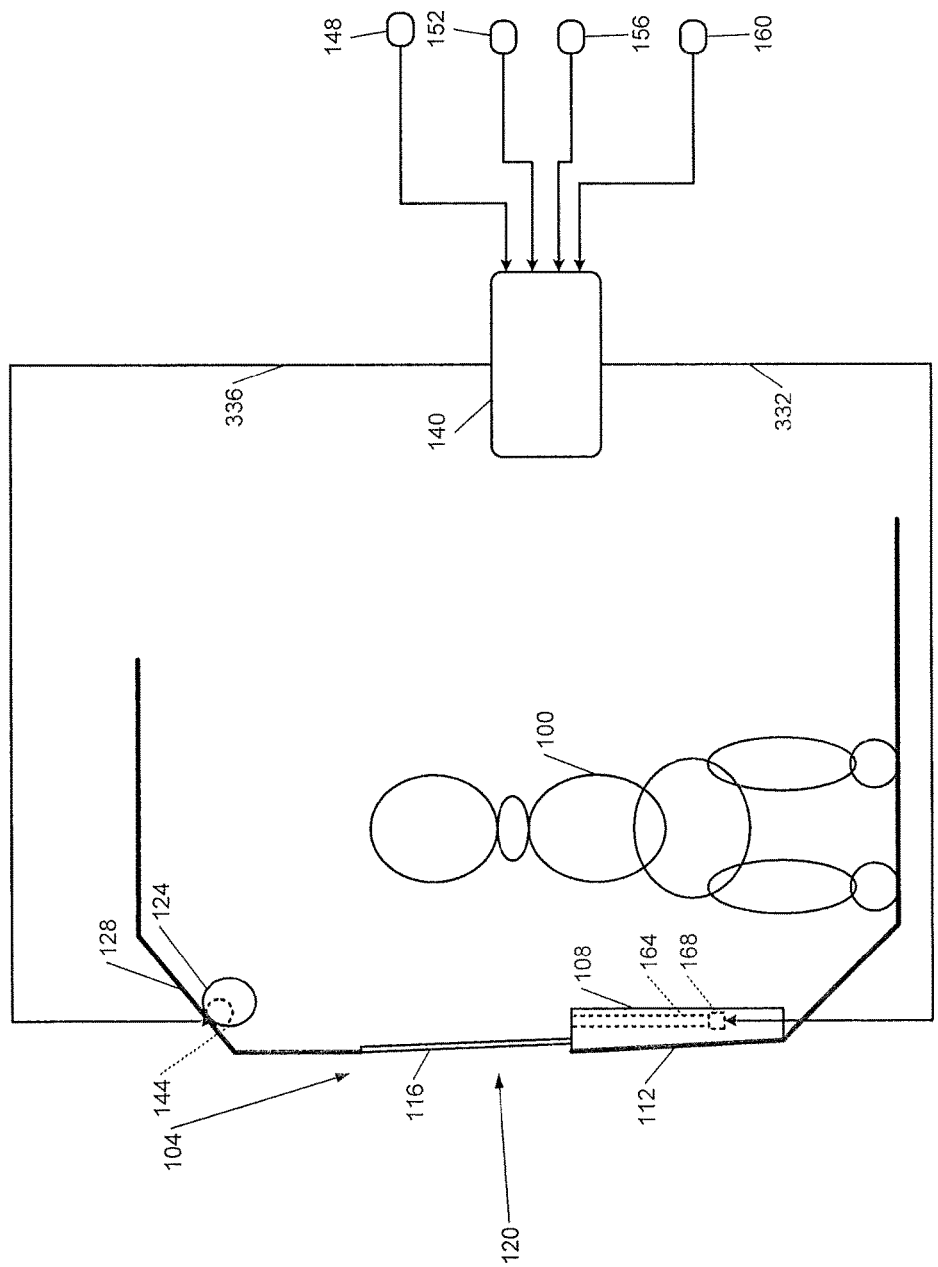

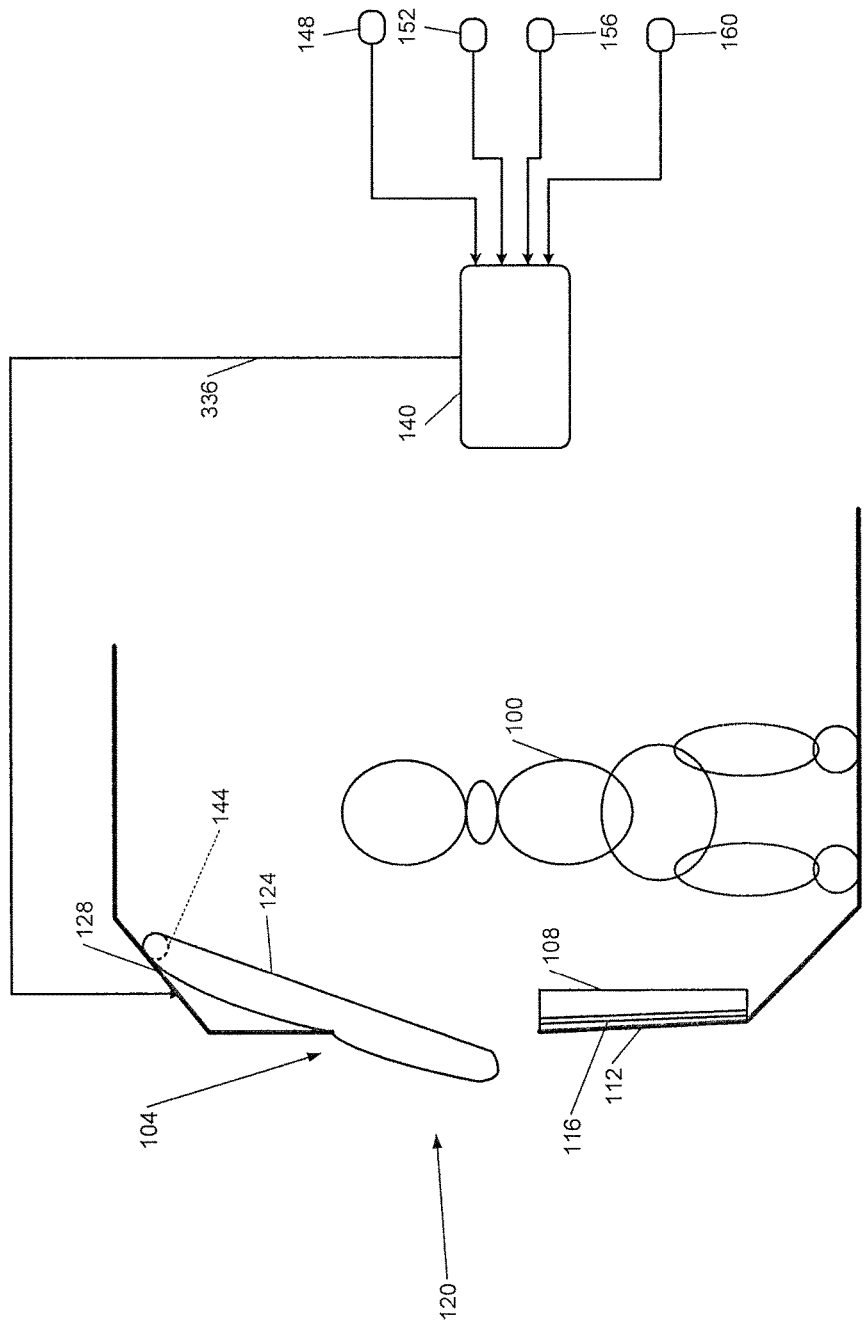

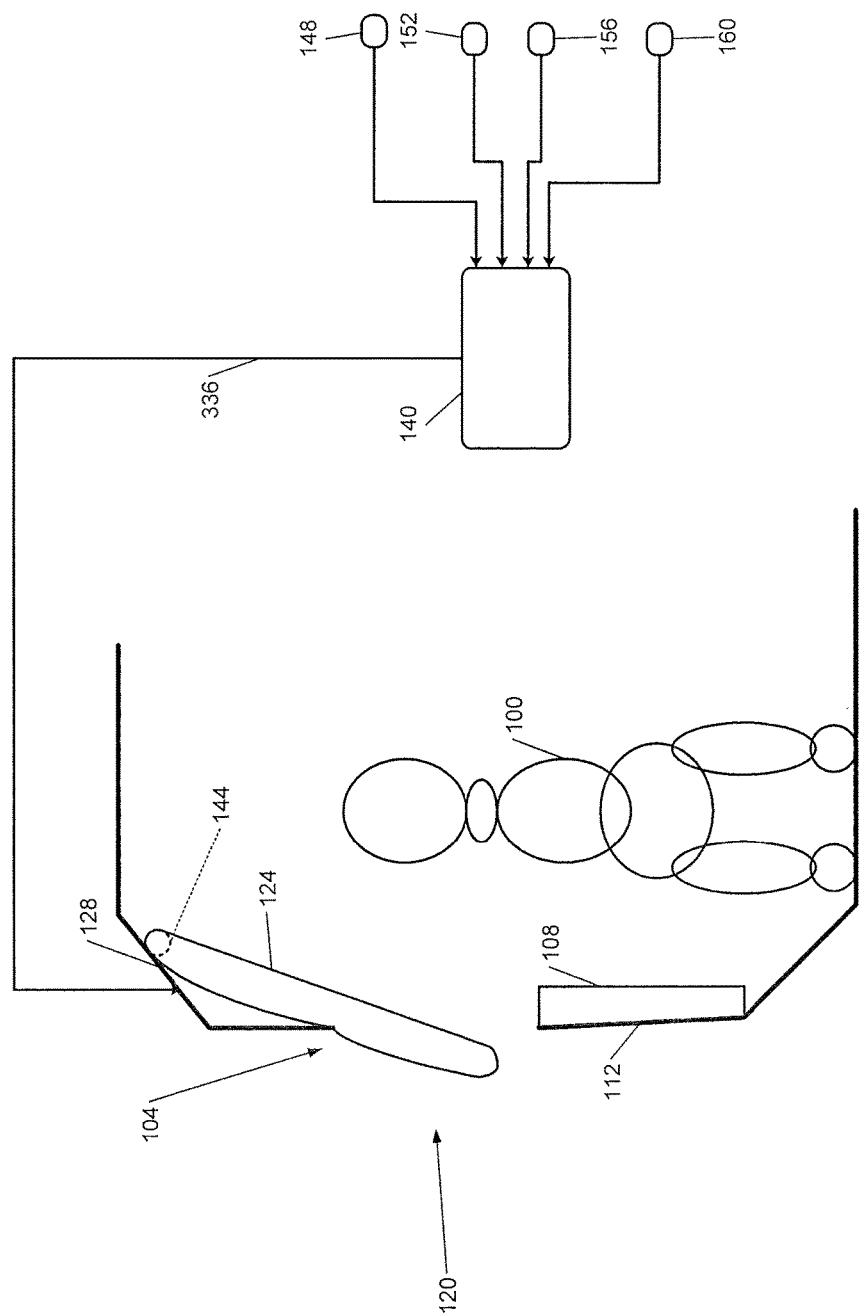

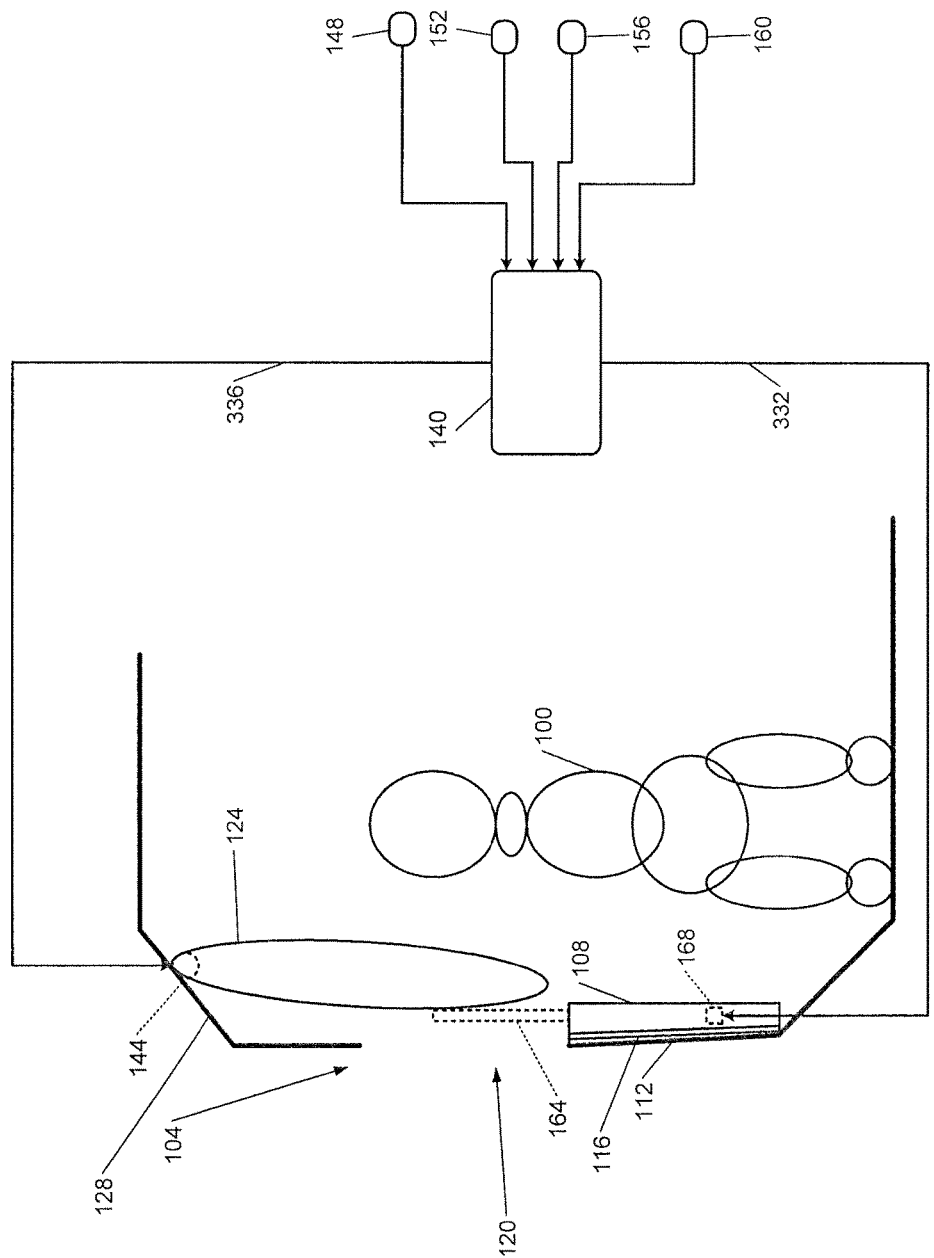

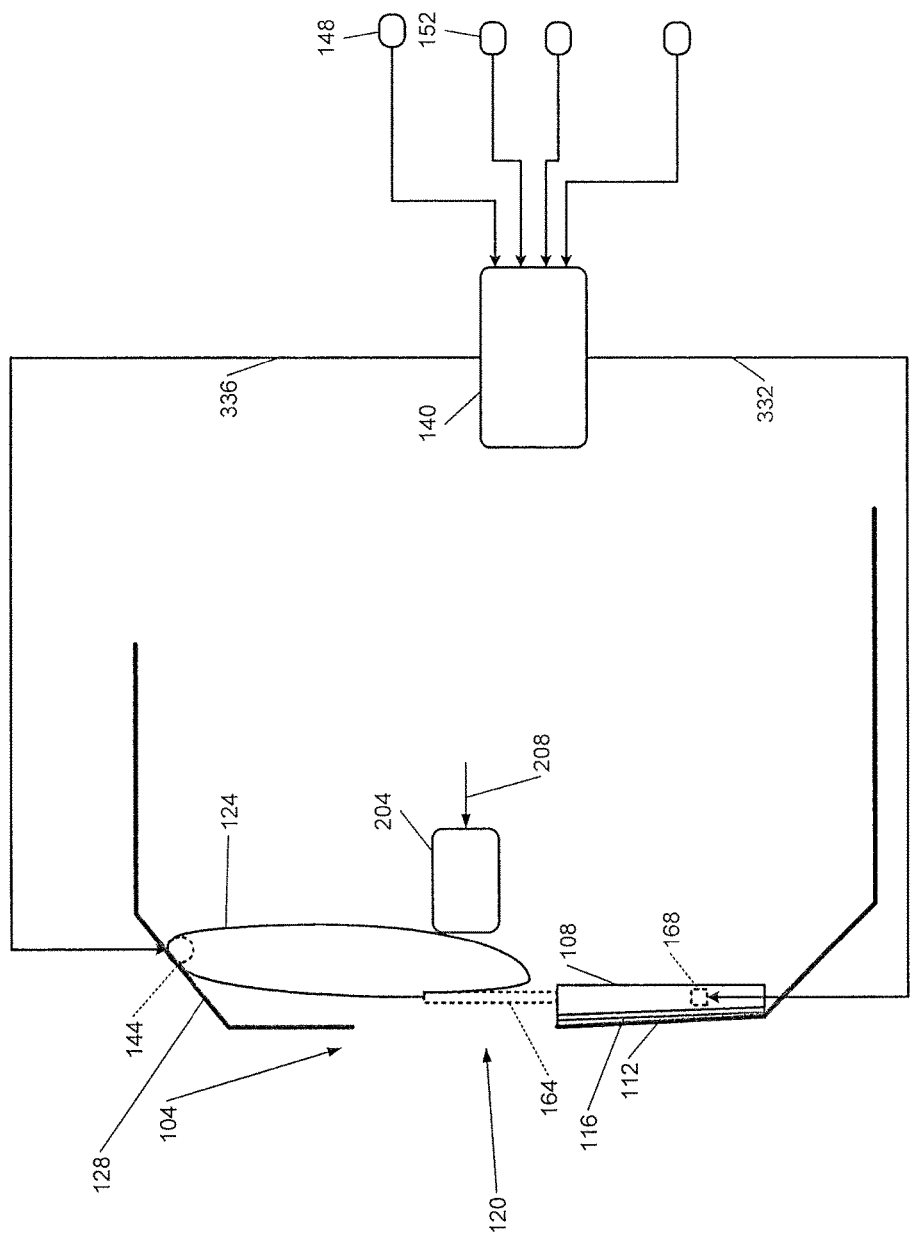

SYSTEMS AND METHODS FOR DEPLOYABLE REACTION SURFACE FOR ROOF RAIL AIRBAG SYSTEM

FIELD

The present disclosure relates to occupant restraint systems of vehicles and more particularly systems and methods for deploying reaction surfaces for roof rail airbags.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Various occupant restraint devices are available in vehicles. For example, vehicles include seat belts that restrain movement of vehicle occupants during a crash event. Seat belts are located at each designated seating position and may be designed to accommodate a large range of occupant sizes.

Another type of occupant restraint device is a system of one or more airbags. For example, an airbag may be implemented within a steering wheel of the vehicle. Upon detection of a frontal collision, the airbag within the steering wheel may be deployed in an effort to manage the energy of the driver of the vehicle due to the crash forces.

SUMMARY

In a feature, an occupant restraint system of a vehicle includes a roof rail airbag that is located at a roof rail of the vehicle and above a door of the vehicle and that is configured to deploy in an outboard direction. A deployment device, when triggered, deploys the roof rail airbag. An actuator, when triggered, actuates a deployable reaction surface (i) from a first state where the deployable reaction surface is stowed behind interior door trim and does not block any part of a window opening of the door when viewed from inboard of the deployable reaction surface (ii) to a second state where the deployable reaction surface blocks at least a portion of the window opening of the door when viewed from inboard of the deployable reaction surface.

In further features, the actuator includes an igniter and a pyrotechnic device, and wherein the igniter ignites the pyrotechnic device when the actuator is triggered.

In further features, a restraint control module selectively triggers the actuator and the deployment device.

In further features, the restraint control module triggers the actuator and the deployment device when a vehicle rollover event is detected.

In further features, the restraint control module triggers the actuator at a first time and triggers the deployment device at a second time, wherein the second time is after the first time.

In further features, the restraint control module triggers the actuator and the deployment device concurrently.

In further features, the restraint control module triggers the deployment device at a first time and triggers the actuator at a second time, wherein the second time is after the first time.

In further features, the deployable reaction surface is located inboard of a location for window glass of the door.

In further features, the roof rail airbag contacts the deployable reaction surface during deployment of the roof rail airbag.

In further features, the roof rail airbag directly contacts the deployable reaction surface in response to contact from an object from within the vehicle.

In a feature, an occupant restraint method for a vehicle includes: by a deployment device, selectively deploying a roof rail airbag that is located at a roof rail of the vehicle and above a door of the vehicle and that is configured to deploy in an outboard direction; and by an actuator, selectively actuating a deployable reaction surface (i) from a first state where the deployable reaction surface is stowed behind interior door trim and does not block any part of a window opening of the door when viewed from inboard of the deployable reaction surface (ii) to a second state where the deployable reaction surface blocks at least a portion of the window opening of the door when viewed from inboard of the deployable reaction surface.

In further features, the actuator includes an igniter and a pyrotechnic device.

In further features, selectively actuating the deployable reaction surface includes actuating the deployable reaction surface, by the actuator, in response to a trigger from a restraint control module.

In further features, the method further includes, by the restraint control module, triggering the actuator when a vehicle rollover event is detected.

In further features: selectively actuating the deployable reaction surface includes, by the actuator, actuating the deployable reaction surface at a first time; selectively deploying the roof rail includes, by the deployment device, deploying the roof rail airbag at a second time; and the second time is after the first time.

In further features, selectively deploying the roof rail and selectively actuating the deployable reaction surface includes concurrently (i) deploying the roof rail airbag and (ii) actuating the deployable reaction surface.

In further features: selectively deploying the roof rail includes, by the deployment device, deploying the roof rail airbag at a first time; selectively actuating the deployable reaction surface includes, by the actuator, actuating the deployable reaction surface at a second time; and the second time is after the first time.

In further features, the deployable reaction surface is located inboard of a location for window glass of the door.

In further features, the roof rail airbag contacts the deployable reaction surface during deployment of the roof rail airbag.

In further features, the roof rail airbag directly contacts the deployable reaction surface in response to contact from an object from within the vehicle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 1A, 1B, 2A, 2B, 3, and 4 are functional block diagrams of an occupant restraint system of a vehicle including a deployable reaction surface and a roof rail airbag;

In the drawings, reference numbers may be reused to identify similar and/or identical elements.

DETAILED DESCRIPTION

Figure 1B:
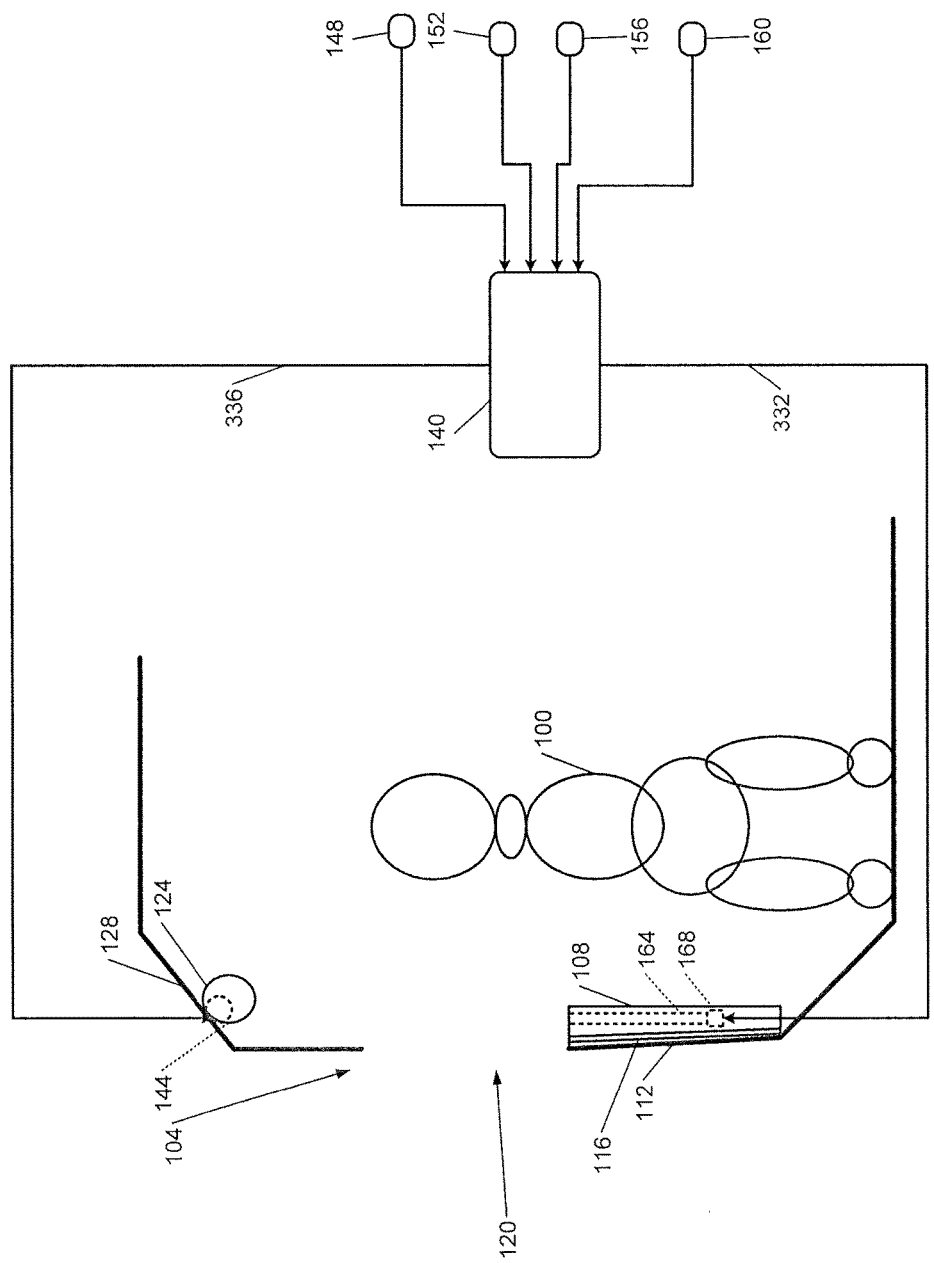

Vehicles may include one or more different types of airbag systems. One type of airbag system includes a roof rail airbag system. In a roof rail airbag system, a roof rail airbag is stowed at a roof rail above a door of the vehicle. The roof rail airbag may be deployed to manage the energy of vehicle occupants, for example, in the event of a side impact or a vehicle rollover. During deployment of the roof rail airbag, a window of the door may direct the roof rail airbag to a space between the occupant and the adjacent side window. If the window of the door is open or missing, however, the roof rail airbag may deploy in a trajectory that results in a portion of the roof rail airbag extending through a window opening of the door.

The present application describes a deployable reaction surface that is normally stowed within an interior trim panel of the door of the vehicle. The deployable reaction surface is stowed and deployed inboard of the window of the door. The deployable reaction surface is deployed before or when the roof rail airbag of that door is deployed. When deployed, the deployable reaction surface directs deployment of the roof rail airbag inboard, thereby preventing the roof rail airbag from extending through the window opening of the door if the window is stowed or missing. The deployable reaction surface also serves as a reaction surface/stop for the roof rail airbag when the roof rail airbag is contacted from within the vehicle, such as by an occupant or by an impactor during vehicle testing. The deployable reaction surface may also protect the roof rail airbag from being contacted by objects external to the vehicle.

FIG. 1A is a functional block diagram of an occupant restraint system of a vehicle. One or more occupants, such as occupant 100, are seated within a passenger cabin (or occupant compartment) of the vehicle. FIG. 1A includes a cross-sectional view of a portion of the passenger cabin. The occupant 100 is shown as seated beside a door which is generally illustrated by 104.

The door 104 includes a door trim assembly 108 that is fastened to the interior of a door frame 112. The door trim assembly 108 covers various electrical and/or mechanical components from view from within the passenger cabin. For example, the door trim assembly 108 covers a window 116 of the door when the window 116 is in a stowed position and a window opening 120 of the door is fully open. The door trim assembly 108 also covers a window motor mechanism (not shown) that moves the window between the stowed position and a fully closed position and other mechanical and/or electrical components of the vehicle.

FIG. 1B includes a functional block diagram of the occupant restraint system with the window 116 in the stowed position. The window opening 120 is also fully open when the window 116 is missing or has otherwise been removed from the vehicle. In FIG. 1A, the window 116 is shown in a fully closed position.

Referring now to FIGS. 1A and 1B, a roof rail airbag 124 is attached at a roof rail 128 above the door 104. One or more pieces of interior trim (not shown) may be fastened to the interior of the roof rail 128 to cover the roof rail airbag 124 from view when the roof rail airbag 124 is stowed before deployment. FIGS. 1A and 1B illustrate the roof rail airbag 124 stowed/before deployment. The roof rail airbag 124 is configured to deploy in an outboard direction.

A restraint control module 140 selectively triggers a deployment device 144 to inflate/deploy the roof rail airbag 124. The deployment device 144 may include, for example, an igniter and a pyrotechnic device that ignites and fills the roof rail airbag 124 with gas (e.g., air) when triggered. While the example of an igniter and a pyrotechnic device is provided, another suitable type of deployment device may be used.

The restraint control module 140 may trigger the deployment device 144 when one or more conditions are satisfied, such as when a vehicle rollover event and/or a side impact of the vehicle is detected. The restraint control module 140 may detect the occurrence of a vehicle rollover event, for example, based on signals from one or more sensors.

The one or more sensors may include, for example, a yaw rate sensor 148, a lateral acceleration sensor 152, a vehicle roll velocity sensor 156, and/or one or more suspension displacement sensors, such as sensor displacement sensor 160. The yaw rate sensor 148 measures a yaw rate of the vehicle. The lateral acceleration sensor 152 measures a lateral acceleration of the vehicle. The roll velocity sensor 156 measures a roll velocity (or roll rate) of the vehicle. The suspension displacement sensors measure displacement of one or more suspension components of the vehicle relative to a reference. For example, one or more suspension components of a wheel may extend when the wheel lifts off of the ground, such as during a vehicle rollover event. One or more suspension displacement sensors may be provided for each wheel of the vehicle.

The door 104 also includes a deployable reaction surface 164 that is stowed behind the door trim assembly 108 before deployment. FIGS. 1A and 1B illustrate the deployable reaction surface 164 in a stowed position within the door trim assembly 108 before deployment of the deployable reaction surface 164. The deployable reaction surface 164 may be made of a plastic (e.g., ABS plastic) and/or one or more other types of material. In various implementations, the deployable reaction surface 164 may include a frame with a netting material attached to the frame.

The restraint control module 140 selectively triggers an actuator 168 to actuate/deploy the deployable reaction surface 164. The restraint control module 140 may trigger the actuator 168, for example, before or concurrently with triggering the deployment device 144 to deploy the roof rail airbag 124.

The actuator 168 may include, for example, an igniter and a pyrotechnic device, a linear actuator, or one or more other suitable devices that actuate(s) the deployable reaction surface 164 into a deployed position when triggered. The deployable reaction surface 164 may be actuated into the deployed position along one or more tracks (not shown). Once the deployable reaction surface 164 reaches the deployed position, a latching mechanism (not shown) may latch and maintain the deployable reaction surface 164 in approximately the deployed position until the latching mechanism is released.

When in the deployed position, the deployable reaction surface 164 occupies space between a space occupied by the roof rail airbag 124 after its deployment and a space occupied by the window 116 when the window 116 is present and in the fully closed position. Before and after deployment, the deployable reaction surface 164 is located inboard of the window 116. The deployable reaction surface 164 obstructs flow through all of or at least a portion of the window opening 120 when the deployable reaction surface 164 is in the deployed position. A height of the deployable reaction surface 164 may be at least one-quarter, at least one-third, at least one-half, at least two-thirds, at least three-quarters, or at least equal to a height of the window opening 120. When the roof rail airbag 124 is deployed, a lower end of the roof rail airbag 124 extends below an upper edge of the deployable reaction surface 164 when deployed. While the example of a bottom most point of the roof rail airbag 124 being located above a belt line after deployment of the roof rail airbag 124 is provided, the roof rail airbag 124 may extend below the belt line. The belt line may refer to, for example, a horizontal plane at a lowest (vertical) point of the window opening 120. If the window 116 is not present or in the stowed position and the deployable reaction surface 164 was not included, a portion of the roof rail airbag 124 may extend into/through the window opening 120 when the roof rail airbag 124 is deployed. FIG. 2A illustrates the roof rail airbag 124 extending at least partially entering the window opening 120 after deployment when the window 116 is in the stowed position and the deployable reaction surface 164 is not present. FIG. 2B illustrates the roof rail airbag 124 extending at least partially entering the window opening 120 after deployment when the window 116 is not present and the deployable reaction surface 164 is not present. The protrusion shown is only as an example, and the protrusion of the deployable reaction surface 164 may be different than shown. When the window 116 is present and in the closed position, the window 116 may direct the roof rail airbag 124 into position during deployment of the roof rail airbag 124.

When in the deployed position, the deployable reaction surface 164 serves as a surrogate for the window 116 and directs the roof rail airbag 124 into position during deployment of the roof rail airbag 124. This prevents the roof fail airbag 124 from extending into the window opening 120 if the window 116 is in the stowed position or is not present. FIG. 3 illustrates the roof rail airbag 124 after deployment and the deployable reaction surface 164 after deployment. While the example of FIG. 3 illustrates a separation between the roof rail airbag 124 and the deployable reaction surface 164 after deployment, the roof rail airbag 124 and the deployable reaction surface 164 may contact each other during and after deployment.

The deployable reaction surface 164 also serves as a support/stop for the roof rail airbag 124 when the roof rail airbag 124 is contacted from within the passenger cabin. FIG. 4 illustrates the roof rail airbag 124 being pushed into contact with the deployable reaction surface 164 in response to an object 204 applying force 208 from within the vehicle. The object 204 may be, for example, an occupant, an object within the vehicle, or an impactor during vehicle testing. While the example of one object at a location is provided, multiple objects may contact the roof rail airbag 124 and/or an object may contact the roof rail airbag 124 from a different location and/or angle within the vehicle. Also, while the example of one door is shown and discussed, a deployable reaction surface and an actuator may be provided for two or more doors of a vehicle.

Figure 5:
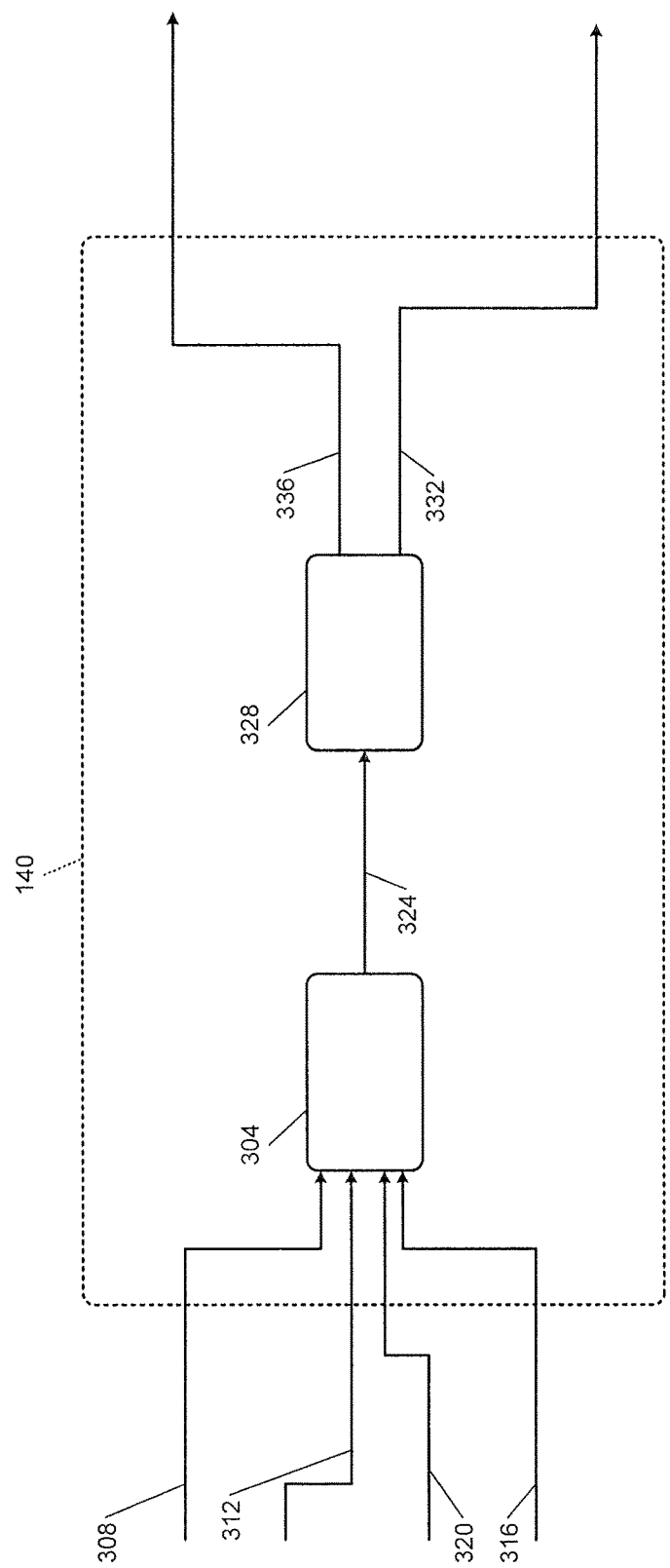
FIG. 5 includes a functional block diagram of an example implementation of a restraint control module.
Figure 6:
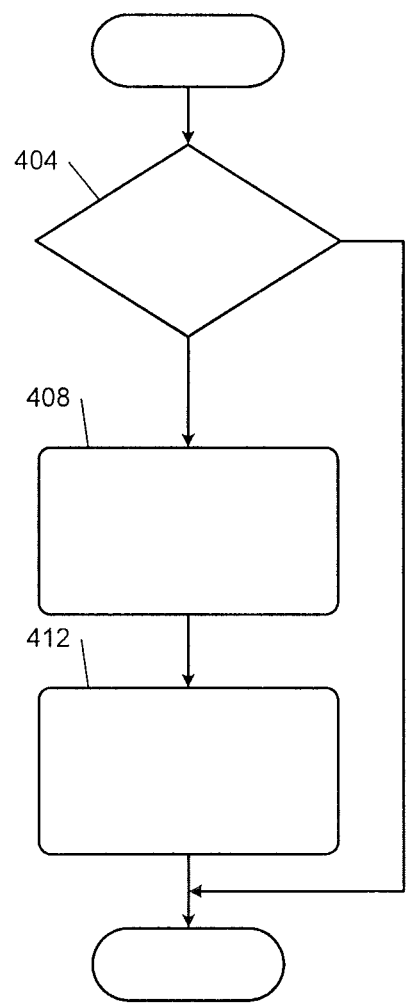
FIG. 6 is a flowchart depicting an example method of deploying a deployable reaction surface and a roof rail airbag.

FIG. 5 includes a functional block diagram of an example implementation of the restraint control module 140. FIG. 6 is a flowchart depicting an example method of deploying the deployable reaction surface 164 and the roof rail airbag 124.

Referring now to FIGS. 5 and 6, control may begin with 404 (FIG. 6) where a condition module 304 (FIG. 5) determines whether one or more conditions are satisfied for deploying the deployable reaction surface 164 and the roof rail airbag 124.

For example, the condition module 304 may determine whether a vehicle rollover event is occurring or will occur. The condition module 304 may determine that a vehicle rollover event is occurring or will occur, for example, when a vehicle yaw rate 308 and a lateral acceleration 312 of the vehicle are greater than a predetermined yaw rate and a predetermined acceleration, respectively. Additionally, the condition module 304 may require that a suspension displacement 316 of one or more wheels is greater than a predetermined value. Additionally or alternatively, the condition module 304 may determine that a vehicle rollover event is occurring or will occur when a roll velocity 320 of the vehicle is greater than a predetermined roll velocity. the vehicle yaw rate 308, the lateral acceleration 312, the roll velocity 320, and the suspension displacement 316 may be measured using the sensors 148-160, respectively. If 404 is true, the condition module 304 generates a condition signal 324 and continues with 408 (FIG. 6). If 404 is false, control may end.

At 408, a triggering module 328 (FIG. 5) generates a trigger signal 332 in response to the condition signal 324, and the actuator 168 deploys the deployable reaction surface 164 in response to the trigger signal 332. At 412, the triggering module 328 generates a trigger signal 336 in response to the condition signal 324, and the deployment device 144 deploys the roof rail airbag 124 in response to the trigger signal 336. While the example of the triggering module 328 triggering deployment of the deployable reaction surface 164 before the roof rail airbag 124 is provided, the triggering module 328 may trigger deployment of the deployable reaction surface 164 and the roof rail airbag 124 concurrently or may trigger the deployment of the deployable reaction surface 164 after triggering deployment of the roof rail airbag 124. Also, while control is shown as ending, FIG. 6 is illustrative of one control loop and control may return to 404.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An occupant restraint system of a vehicle, comprising:
   a roof rail airbag that is located at a roof rail of the vehicle and above a door of the vehicle and that is configured to, throughout deployment, deploy in an outboard direction;
   a deployment device that, when triggered, deploys the roof rail airbag;
   a deployable reaction surface; and
   an actuator that, when triggered, actuates the deployable reaction surface (i) from a first state where the deployable reaction surface is stowed behind interior door trim and does not block any part of a window opening of the door when viewed from inboard of the deployable reaction surface (ii) to a second state where the deployable reaction surface blocks at least a portion of the window opening of the door when viewed from inboard of the deployable reaction surface.

2. The occupant restraint system of claim 1 wherein the actuator includes an igniter and a pyrotechnic device, and wherein the igniter ignites the pyrotechnic device when the actuator is triggered.

3. The occupant restraint system of claim 1 further comprising a restraint control module that selectively triggers the actuator and the deployment device.

4. The occupant restraint system of claim 3 wherein the restraint control module triggers the actuator and the deployment device when a vehicle rollover event is detected.

5. The occupant restraint system of claim 3 wherein the restraint control module triggers the actuator at a first time and triggers the deployment device at a second time, wherein the second time is after the first time.

6. The occupant restraint system of claim 3 wherein the restraint control module triggers the actuator and the deployment device concurrently.

7. The occupant restraint system of claim 3 wherein the restraint control module triggers the deployment device at a first time and triggers the actuator at a second time, wherein the second time is after the first time.

8. The occupant restraint system of claim 1 wherein the deployable reaction surface is located inboard of a location for window glass of the door.

9. The occupant restraint system of claim 1 wherein the roof rail airbag contacts the deployable reaction surface during deployment of the roof rail airbag.

10. The occupant restraint system of claim 1 wherein the roof rail airbag directly contacts the deployable reaction surface in response to contact from an object from within the vehicle.

11. An occupant restraint method for a vehicle, comprising:
by a deployment device, selectively deploying a roof rail airbag that is located at a roof rail of the vehicle and above a door of the vehicle and that is configured to, throughout deployment, deploy in an outboard direction; and
by an actuator, selectively actuating a deployable reaction surface (i) from a first state where the deployable reaction surface is stowed behind interior door trim and does not block any part of a window opening of the door when viewed from inboard of the deployable reaction surface (ii) to a second state where the deployable reaction surface blocks at least a portion of the window opening of the door when viewed from inboard of the deployable reaction surface.

12. The occupant restraint method of claim 11 wherein the actuator includes an igniter and a pyrotechnic device.

13. The occupant restraint method of claim 11 wherein selectively actuating the deployable reaction surface includes actuating the deployable reaction surface, by the actuator, in response to a trigger from a restraint control module.

14. The occupant restraint method of claim 13 further comprising, by the restraint control module, triggering the actuator when a vehicle rollover event is detected.

15. The occupant restraint method of claim 11 wherein:
selectively actuating the deployable reaction surface includes, by the actuator, actuating the deployable reaction surface at a first time;
selectively deploying the roof rail includes, by the deployment device, deploying the roof rail airbag at a second time; and
the second time is after the first time.

16. The occupant restraint method of claim 11 wherein selectively deploying the roof rail and selectively actuating the deployable reaction surface includes concurrently (i) deploying the roof rail airbag and (ii) actuating the deployable reaction surface.

17. The occupant restraint method of claim 11 wherein:
selectively deploying the roof rail includes, by the deployment device, deploying the roof rail airbag at a first time;
selectively actuating the deployable reaction surface includes, by the actuator, actuating the deployable reaction surface at a second time; and
the second time is after the first time.

18. The occupant restraint method of claim 11 wherein the deployable reaction surface is located inboard of a location for window glass of the door.

19. The occupant restraint method of claim 11 wherein the roof rail airbag contacts the deployable reaction surface during deployment of the roof rail airbag.

20. The occupant restraint method of claim 11 wherein the roof rail airbag directly contacts the deployable reaction surface in response to contact from an object from within the vehicle.

* * * * *